United States Patent
Soloviev

(10) Patent No.: US 12,022,228 B2
(45) Date of Patent: Jun. 25, 2024

(54) X-RAY TOMOGRAPHY SYSTEM AND METHOD

(71) Applicant: ADAPTIX LTD, Begbroke (GB)

(72) Inventor: Vadim Soloviev, Begbroke (GB)

(73) Assignee: ADAPTIX LTD, Begbroke (GB)

( * ) Notice: Subject to any disclaimer, the term of this patent is extended or adjusted under 35 U.S.C. 154(b) by 244 days.

(21) Appl. No.: 17/670,840

(22) Filed: Feb. 14, 2022

(65) Prior Publication Data

US 2022/0166943 A1    May 26, 2022

Related U.S. Application Data

(63) Continuation of application No. PCT/IB2020/057671, filed on Aug. 14, 2020.

(30) Foreign Application Priority Data

Aug. 14, 2019 (GB) ...................................... 1911656

(51) Int. Cl.
  *G06T 5/00* (2006.01)
  *H04N 5/32* (2023.01)
(52) U.S. Cl.
  CPC ................ *H04N 5/32* (2013.01); *G06T 5/00* (2013.01); *G06T 2207/10112* (2013.01)
(58) Field of Classification Search
  CPC .. G06T 19/00; G06T 9/00; G06T 9/02; G06T 2223/421; G06T 2223/50; G06T 2291/04;
  (Continued)

(56) References Cited

U.S. PATENT DOCUMENTS 5,341,460 A    8/1994  Tam
5,463,666 A   10/1995  Eberhard et al.
(Continued)

FOREIGN PATENT DOCUMENTS

EP    0492895        11/1992
JP    H06-028454      2/1994
(Continued)

OTHER PUBLICATIONS

UKIPO, Examination Report in corresponding GB application GB1911656.5, dated Feb. 22, 2022.
UKIPO, Combined Search and Examination Report in corresponding GB application GB1911656.5, dated Feb. 17, 2020.
K. C. Tam, "Computation of Radon Data from Cone Beam Data in Cone Beam Imaging," 1998, J. of Nondestructive Eval., vol. 1, No. 1.
(Continued)

*Primary Examiner* — Don K Wong
(74) *Attorney, Agent, or Firm* — Alley IP

(57) ABSTRACT

Digital Tomosynthesis (DT) is a type of limited angle tomography providing the benefits of 3D imaging. Much like Computerized Tomography (CT), DT allows greater detection of 3D structures by viewing one slice at a time. In contrast to CT, the DT projection dataset is incomplete, which violates the tomographic sufficiency conditions and results in limited angle artefacts in the reconstructed images. The present invention provides a method of producing a tomogram in which reconstruction is performed along lines on the x-ray detector panel 20 defined by a point on the detector panel 20 closest to a point location of the x-ray emitter 10, to a location of a respective pixel on the perimeter of the x-ray detector panel 20. In this way, artefact reduction is achieved, particularly at higher cone beam angles, and at lower stand-off distances.

5 Claims, 2 Drawing Sheets

(58) Field of Classification Search
CPC ......... G06T 2291/043; G06T 2291/048; G06T 2291/10; G06T 2291/102; G06T 2291/103; G06T 2291/104; G06T 2291/105; G06T 2291/106; G06T 23/046; G06T 1/00; G06T 3/02; G06T 11/006; G06T 11/008; G06T 15/00; G06T 15/08; G06T 15/10; G06T 17/00
See application file for complete search history.

(56) References Cited

U.S. PATENT DOCUMENTS

| | | | |
|---|---|---|---|
| 5,802,134 | A | 9/1998 | Larson et al. |
| 6,009,142 | A * | 12/1999 | Sauer .................... G06T 11/006 378/4 |
| 2014/0212018 | A1 | 7/2014 | Hein et al. |
| 2015/0228092 | A1 | 8/2015 | Claus |

FOREIGN PATENT DOCUMENTS

| | | |
|---|---|---|
| JP | 2000-515411 | 11/2000 |
| JP | 2014-147772 | 8/2014 |

OTHER PUBLICATIONS

WIPO, International Search Report in corresponding PCT application PCT/IB2020/057671, dated Nov. 11, 2020.
WIPO, Written Opinion in corresponding PCT application PCT/IB2020/057671, dated Nov. 11, 2020
Feldkamp et al., "Practical cone-beam algorithm" Jun. 1984.
Soloviev et al., "Meshless reconstruction technique for digital tomosynthesis" Feb. 2020.
UKIPO, Examination Report in corresponding GB application 1911656.5, dated Sep. 29, 2022.
JPO, Notice of Reasons for Refusal in corresponding JP application 2022-509704, Mar. 28, 2024.

* cited by examiner

X-RAY TOMOGRAPHY SYSTEM AND METHOD

RELATED APPLICATIONS

This application claims the benefit under 35 U.S.C. § 120, and is a continuation, of co-pending International Application PCT/IB2020/057671, filed Aug. 14, 2020 and designating the US, which claims priority to GB Application 1911656.5, filed Aug. 14, 2019, such GB Application also being claimed priority to under 35 U.S.C. § 119. These GB and International applications are incorporated by reference herein in their entireties.

FIELD

The present invention relates generally to a digital tomography and finds particular, although not exclusive, utility in x-ray tomography.

BACKGROUND

Digital Tomosynthesis (DT) is a type of limited angle tomography providing the benefits of 3D imaging. Much like Computerized Tomography (CT), DT allows greater detection of 3D structures by viewing one slice at a time. A high in-plane resolution, three-dimensionality and a low radiation dose make DT an attractive alternative to CT in many medical imaging applications.

In contrast to CT, the DT projection dataset is incomplete, which violates the tomographic sufficiency conditions and results in limited angle artefacts in the reconstructed images. Although DT is a volumetric imaging technique and provides information on an object's internal structure, the entire 3D information about the object cannot be reconstructed. Therefore, one of the important issues is the improvement of the tomosynthesis image quality.

There exist different scanning geometries of DT depending on how the x-ray source moves its position relative to the detector during data acquisition. Those include: linear DT, where the source and the detector both move parallel to the focus plane in relative opposing directions; partial isocentric scanning DT, where the detector stays in one plane while the source rotates around the isocentre; and circular DT, where the source rotates around a fixed axis that passes through the object with the detector either rotating or fixed. All these scanning geometries involve a single x-ray source.

SUMMARY

An emitter panel consisting of an array of small x-ray emitters rather than a single source is advantageous because no physical movement is required avoiding the cost of motorized movers, and avoiding motion blur by electronically switching between emitters. On the scale of each individual emitter, the principle remains the same as before. That is, each emitter produces a cone beam of x-rays. Therefore, the well-known cone beam image reconstruction algorithm is a natural choice.

There is generally a desire to reduce the stand-off distance (SID or SOD). If one attempts to do this using existing known approaches, then a large distortion is introduced and hence a shift in the path length (and thus in the attenuation), which can lead to problems.

According to the present invention, there is provided a method of producing a tomogram, the method comprising the steps of: providing an x-ray detector panel comprising a plurality of pixels; providing an x-ray emitter spaced from the x-ray detector panel; emitting a cone of x-ray radiation from the emitter toward a detector panel; producing an attenuation image at the detector panel in response to the cone of x-ray radiation impinging the detector panel; and reconstructing a density function indicative of attenuation of the x-ray radiation by, for each respective one of a plurality of straight lines extending across the x-ray detector panel, applying a Radon transform inversion formula, wherein the plurality of lines comprises each unique straight line defined by: an origin location of a point on the detector panel closest to a point location of the x-ray emitter; and a pixel location of each respective pixel of the plurality of pixels on a perimeter of the plurality of pixels.

In this way, artefact reduction is achieved, particularly at higher cone beam angles, and at lower stand-off distances.

The method may explicitly include the step of producing a tomogram from the reconstructed density function.

The method may comprise providing at least one further x-ray emitter spaced from the x-ray detector panel; that is, the method may comprise providing a plurality of x-ray emitters spaced from the x-ray detector panel. The plurality of emitters may form an emitter panel.

The method may further comprise emitting at least one further cone of x-ray radiation from the at least one further x-ray emitter toward a detector panel; that is, a single cone of x-ray radiation from each of the plurality of x-ray emitters.

The method may comprise producing a respective attenuation image at the detector panel in response to each cone of x-ray radiation impinging the detector panel.

The method may comprise reconstructing a density function indicative of attenuation of the x-ray radiation by, for each respective one of a plurality of straight lines extending across the x-ray detector panel, applying a Radon transform inversion formula, wherein the plurality of lines comprises each unique straight line defined by: an origin location of a point on the detector panel closest to a point location of the x-ray emitter; and a pixel location of each respective pixel of the plurality of pixels on a perimeter of the plurality of pixels, from the attenuation image or the respective attenuation images.

Each respective one of the plurality of straight lines may extending across the entire x-ray detector panel from one side to another. Alternatively or additionally, some or all of the straight lines may extend across a portion of the x-ray detector panel, for example across a region bounded by plurality of pixels. The origin location may, for example, be a centre of the detector panel; however, in cases where the x-ray emitter is not centred on the panel, the origin location may be displaced on the detector panel from the centre of the detector panel. Each pixel location may be located on a perimeter of the detector panel; however, where the plurality of pixels forms a mere part of the detector panel (for example, a sub-set of a total array of pixels on the panel), some or all of the pixel locations may be displaced from a perimeter of the total array of pixels on the panel.

The step of reconstructing may include ray tracing over the attenuation image for each pixel, or over the respective attenuation images for each pixel.

The Radon transform inversion formula may comprise a Cauchy Principle Value integral.

The step of reconstructing may comprise evaluating the equation:

$$f(r) = \frac{1}{4\pi^2 L} \int_{|s|=1} (L^2 + \ell_0^2)^{1/2} ds \int_{-\infty}^{\infty} \frac{\partial \tilde{f}(\ell, \theta)}{\partial \ell} \frac{d\ell}{\ell_0 - \ell \left(\frac{L^2 + \ell_0^2}{L^2 + \ell^2}\right)^{1/2}}$$

where f(r) is the density function indicative of attenuation of the x-ray radiation.

Evaluation of the above equation may be carried out for each emitter and the results summed, and may be carried out for each pixel and the results summed to obtain a final composite density function.

In addition:

r is a location vector of a point between the emitter and the detector panel, and defines any direction from the emitter to the detector panel;

s is a unit vector, and may be a unit sphere, defining all possible values of r;

L is a distance between the point location of the x-ray emitter and the point on the detector panel closest to the point location of the x-ray emitter;

$\ell$ is a distance parameter across the detector panel from the point on the detector panel closest to the point location of the x-ray emitter to the point on the detector panel in the direction of location vector r; that is, the point that the emitter projects r onto the detector panel;

$\ell_0$ is a distance from the point on the detector panel closest to the point location of the x-ray emitter and a current pixel (e.g. the pixel chosen for this evaluation of the above equation) on the detector panel;

θ is an azimuthal angle parameter at the point location of the x-ray emitter across the detector panel; and $\check{f}$ is the attenuation image at the detector panel.

The first integral may calculate the backprojection of a pixel of the detector panel, and the second integral may act to trace the rays of the pixel.

The density function f(r) may be calculated for each pixel on the detector panel, and then accumulated to determine an overall density function. For each pixel, integration lines pass may through the pixel in a plurality of directions (the number of directions may be the same as the number of emitters). This may act to smears artefacts, such that no cumulative effect as in the case of integration along grid lines.

In this way, the inversion/reconstruction formula may be more conveniently implemented because the integration is performed along lines passing through the origin location and each pixel, rather than along grid lines.

Siddon's Algorithm (i.e. Siddon's ray tracing algorithm) may be used (e.g. across the flat panel detector) to evaluate the Radon transform inversion formula, and/or equation, in particular to evaluate the Cauchy Principle Value integral and consequent backprojection.

According to a second aspect of the present invention, there is provided an x-ray tomography system, comprising: an x-ray detector panel comprising a plurality of pixels; an x-ray emitter spaced from the x-ray detector panel; an imaging system configured to produce an attenuation image at the detector panel in response to a cone of x-ray radiation impinging the detector panel; and a reconstruction system configured to produce a density function indicative of attenuation of the x-ray radiation by, for each respective one of a plurality of straight lines extending across the x-ray detector panel, applying a Radon transform inversion formula, wherein the plurality of lines comprises each unique straight line defined by: an origin location of a point on the detector panel closest to a point location of the x-ray emitter; and a pixel location of each respective pixel of the plurality of pixels on a perimeter of the plurality of pixels.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION

Figure 1:
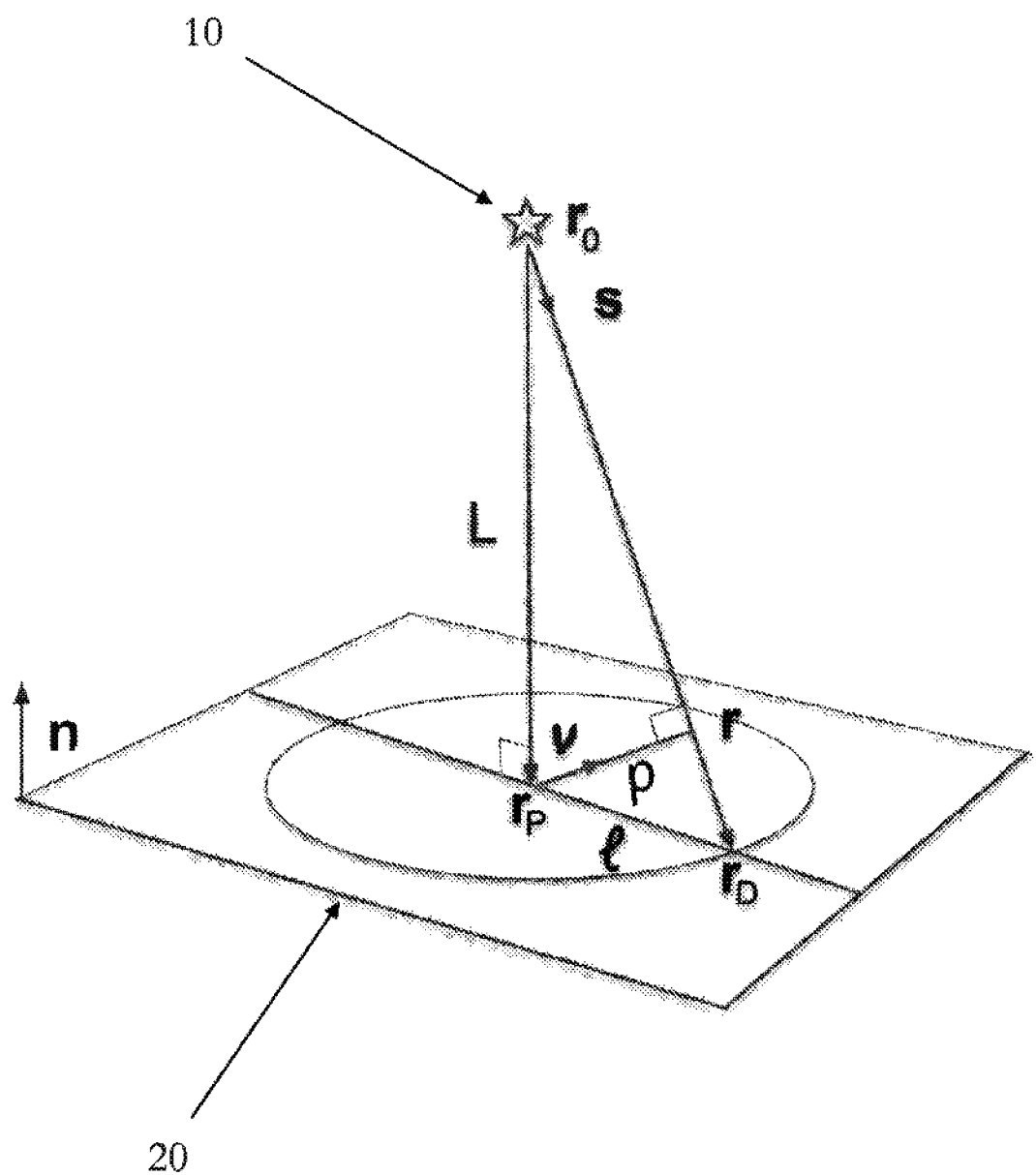
FIG. 1 is a perspective view of the geometry of an x-ray tomography system.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein. Likewise, method steps described or claimed in a particular sequence may be understood to operate in a different sequence.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein an output of device A is directly connected to an input of device B. It means that there exists a path between an output of A and an input of B which may be a path including other devices or means.

"Connected" may mean that two or more elements are either in direct physical or electrical contact, or that two or more elements are not in direct contact with each other but yet still co-operate or interact with each other. For instance, wireless connectivity is contemplated.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any one embodiment or aspect of the invention may be combined in any suitable manner with any other particular feature, structure or characteristic of another embodiment or aspect of the invention, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances. The use of the term "any" may mean "all" and/or "each" in certain circumstances.

The principles of the invention will now be described by a detailed description of at least one drawing relating to exemplary features. It is clear that other arrangements can be configured according to the knowledge of persons skilled in the art without departing from the underlying concept or technical teaching, the invention being limited only by the terms of the appended claims.

FIG. 1 is a perspective view of the geometry of an x-ray tomography system in which an emitter 10 is located at $r_0$ above a detector panel 20, its orientation defined by the normal unit vector n. r is a location vector of a point between the emitter and the detector panel, $r_D$ is a location vector of an image of r projected onto the detector panel along a unit vector s that is in the direction of r from the emitter.

L is a distance between the point location of the x-ray emitter $r_0$ and a point on the detector panel closest to the point location of the x-ray emitter $r_P$; naturally L is measured antiparallel to n. l is a distance parameter across the detector panel 20 from the point on the detector panel closest to the point location of the x-ray emitter $r_P$ to the point on the detector panel $r_D$.

v is a unit vector pointing perpendicular to a ray from the emitter 10 to the point on the detector panel $r_D$, and p is a distance parameter along v from the point on the detector panel closest to the point location of the x-ray emitter $r_P$ to the ray.

Figure 2:
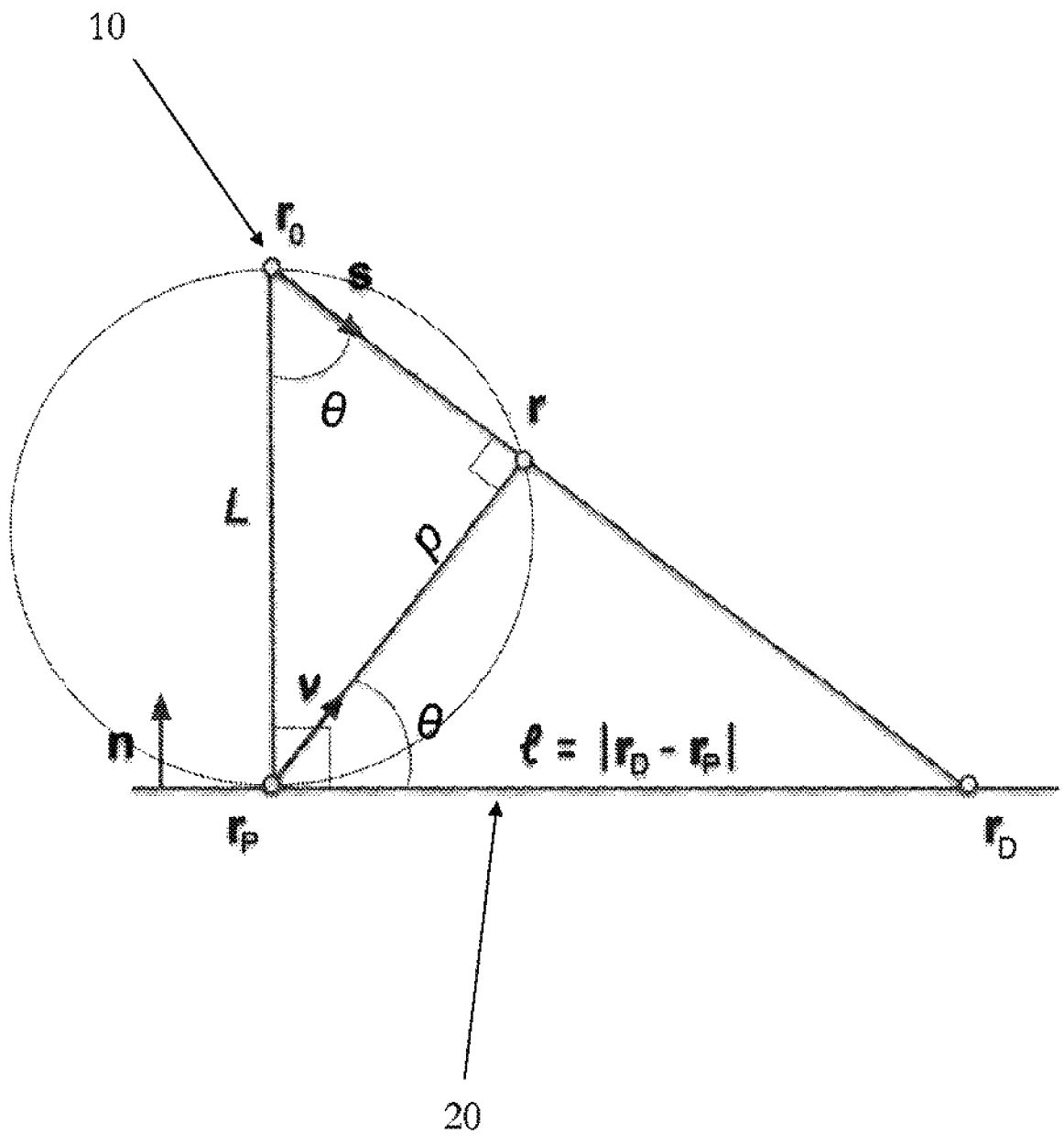
FIG. 2 is a plan view of a slice used in reconstruction.

FIG. 2 is a plan view of a slice used in reconstruction, in which $l_0$ is a distance from the point on the detector panel closest to the point location of the x-ray emitter and a current pixel, and θ is an azimuthal angle parameter at the point location of the x-ray emitter across the detector panel.

The invention claimed is:

1. A method of producing a tomogram, the method comprising the steps of:
   providing an x-ray detector panel comprising a plurality of pixels;
   providing an x-ray emitter spaced from the x-ray detector panel;
   emitting a cone of x-ray radiation from the emitter toward a detector panel;
   producing an attenuation image at the detector panel in response to the cone of x-ray radiation impinging the detector panel; and
   reconstructing a density function indicative of attenuation of the x-ray radiation by, for each respective one of a plurality of straight lines extending across the x-ray detector panel, applying a Radon transform inversion formula, wherein the plurality of lines comprises each unique straight line defined by:
   an origin location of a point on the detector panel closest to a point location of the x-ray emitter; and
   a pixel location of each respective pixel of the plurality of pixels on a perimeter of the plurality of pixels.

2. The method of claim 1, wherein the step of reconstructing includes ray tracing over the attenuation image for each pixel.

3. The method of claim 1, wherein the step of reconstructing comprises evaluating the equation:

$$f(r) = \frac{1}{4\pi^2 L} \int_{|s|=1} (L^2 + \ell_0^2)^{1/2} ds \int_{-\infty}^{\infty} \frac{\partial \breve{f}(\ell, \theta)}{\partial \ell} \frac{d\ell}{\ell_0 - \ell \left(\frac{L^2 + \ell_0^2}{L^2 + \ell^2}\right)^{1/2}}$$

where:
f(r) is the density function indicative of attenuation of the x-ray radiation;
r is a location vector of a point between the emitter and the detector panel;

s is a unit vector in the direction of r;

L is a distance between the point location of the x-ray emitter and the point on the detector panel closest to the point location of the x-ray emitter;

$\ell$ is a distance parameter across the detector panel from the point on the detector panel closest to the point location of the x-ray emitter;

$\ell_0$ is a distance from the point on the detector panel closest to the point location of the x-ray emitter and a current pixel;

θ is an azimuthal angle parameter at the point location of the x-ray emitter across the detector panel; and $\check{f}$ is the attenuation image at the detector panel.

4. The method of claim 3, in which evaluating the equation is by applying Siddon's Algorithm.

5. An x-ray tomography system, comprising:

an x-ray detector panel comprising a plurality of pixels;

an x-ray emitter spaced from the x-ray detector panel;

an imaging system configured to produce an attenuation image at the detector panel in response to a cone of x-ray radiation impinging the detector panel; and a reconstruction system configured to produce a density function indicative of attenuation of the x-ray radiation by, for each respective one of a plurality of straight lines extending across the x-ray detector panel, applying a Radon transform inversion formula, wherein the plurality of lines comprises each unique straight line defined by:

an origin location of a point on the detector panel closest to a point location of the x-ray emitter; and a pixel location of each respective pixel of the plurality of pixels on a perimeter of the plurality of pixels.

* * * * *